United States Patent [19]

Mirous et al.

[11] Patent Number: 5,391,340
[45] Date of Patent: Feb. 21, 1995

[54] METHOD OF MANUFACTURE OF TOP COATED CELLULOSIC PANEL

[75] Inventors: George E. Mirous, Tacoma; Bernard E. Sullivan, Kent, both of Wash.

[73] Assignee: Georgia-Pacific Resins, Inc., Atlanta, Ga.

[21] Appl. No.: 81,210

[22] Filed: Jun. 25, 1993

[51] Int. Cl.$^6$ ............................................. B32B 27/00
[52] U.S. Cl. .................................... 264/112; 264/119
[58] Field of Search ......................... 264/112, 113, 119

[56] References Cited

U.S. PATENT DOCUMENTS

| | | | |
|---|---|---|---|
| 2,926,116 | 2/1960 | Keim . | |
| 3,846,219 | 11/1974 | Kunz | 264/119 |
| 3,951,921 | 4/1976 | Espy et al. . | |
| 4,062,992 | 12/1977 | Power et al. | 428/90 |
| 4,064,297 | 12/1977 | Power et al. | 428/86 |
| 4,109,043 | 8/1978 | DeLapp | 428/206 |
| 4,112,169 | 9/1978 | Huffman et al. | 428/206 |
| 4,113,555 | 9/1978 | Nyren et al. | 162/127 |
| 4,128,696 | 12/1978 | Goebel et al. | 428/424 |
| 4,142,007 | 2/1979 | Lampe et al. | 264/119 |
| 4,165,305 | 8/1979 | Sundie et al. . | |
| 4,237,087 | 12/1980 | Jones | 264/134 |
| 4,258,103 | 3/1981 | Hosmer et al. | 428/342 |
| 4,266,925 | 5/1981 | Book | 428/387.1 |
| 4,361,612 | 11/1982 | Shaner et al. | 428/106 |
| 4,376,745 | 3/1983 | Johns | 264/109 |
| 4,396,448 | 8/1983 | Ohta et al. | 156/219 |
| 4,474,920 | 10/1984 | Kyminas et al. | 524/386 |
| 4,514,255 | 4/1985 | Maxwell et al. | 162/9 |
| 4,517,228 | 5/1985 | Matejka et al. | 427/370 |
| 4,609,513 | 9/1986 | Israel | 264/122 |
| 4,610,900 | 9/1986 | Nishibori | 264/119 |
| 4,654,259 | 3/1987 | Stofko | 428/326 |
| 4,689,102 | 8/1987 | Prawdzik et al. | 156/235 |
| 4,698,257 | 10/1987 | Goll | 428/227 |
| 4,728,680 | 3/1988 | Hahn, Jr. | 523/310 |
| 4,752,637 | 6/1988 | Israel | 524/702 |
| 4,772,442 | 9/1988 | Trout et al. | 264/109 |
| 4,833,182 | 5/1989 | Israel et al. | 524/14 |
| 4,844,968 | 7/1989 | Persson et al. | 264/119 |
| 4,933,232 | 6/1990 | Trout et al. | 428/288 |
| 5,183,672 | 2/1993 | Fetterhoff et al. | 425/304 |
| 5,187,000 | 2/1993 | Chow et al. | 428/141 |
| 5,198,481 | 3/1993 | Cope | 524/9 |

Primary Examiner—Mary Lynn Theisen
Attorney, Agent, or Firm—Banner, Birch, McKie & Beckett

[57] ABSTRACT

A coated panel formed from a self-supporting cellulosic substrate and a top coating containing a thermoset resin having about 0.1–1.5 wt % free formaldehyde admixed with said resin; and (b) a thermoplastic polymer thoroughly admixed with said resin, wherein said thermoplastic polymer exhibits amine groups capable of reacting with at least some of the free formaldehyde under resin curing conditions. The coated panel can be embossed with decorative patterns such as wood grain without fracture of the coated surface or significant buildup on the press or embossing die surfaces.

4 Claims, No Drawings

METHOD OF MANUFACTURE OF TOP COATED CELLULOSIC PANEL

FIELD OF THE INVENTION

The present invention relates to cellulosic panels exhibiting a top coating receptive to embossing with a desired pattern such as a wood grain.

BACKGROUND OF THE TECHNOLOGY

The construction of houses and other buildings involves the use of a variety of materials for walls, floorings and other surfaces. Solid hardwood or soft wood boards are highly desired for such surfaces, but solid boards are often prohibitively expensive. Veneer panels have often been used as an alternative for wall surfaces, but such panels pose their own concerns. As trees of the required type, size and quality become more and more scarce, the manufacture of multilayer veneers or plywoods is expensive with high quality veneer panels becoming difficult to obtain.

Gypsum boards or similar substrates are in widespread use as an alternative to solid boards or veneers. These synthetic panel stock materials are typically made from two outer layers of a thick paper material having an inorganic material, e.g., gypsum or calcium sulphate, in between. Gypsum board suffers from substantial loss of strength and/or structural integrity if the board becomes wet. Moreover, gypsum boards have no inherent grain structure so there is little inherent retention strength for nails, screws or the like which might be used for hanging paintings, photographs, ornaments, or shelving.

The competing needs of reasonable construction costs with high quality buildings has led to expanded uses for alternative wood products. For instance, particle board, fiber board, oriented strand board (OSB), hardboard, and other similar boards are formed from wood that may not otherwise be usable in the construction industry. Boards are also formed from particles, chips, flakes or other fragments of wood. These board stock are being used more and more in the construction of buildings, particularly for wall and floor surfaces and sub-surfaces. Such boards have a quality and integrity that is more than adequate for such uses.

Some of these alternative boards are vulnerable to swelling when exposed to moisture or water. These boards have been coated with wax or otherwise treated to avoid the problems with water. Lund U.S. Pat. No. 4,241,133 discloses that wood flakes may be bonded together with a binder. Examples of the binders include urea/formaldehyde resins, phenol/formaldehyde resins, melamine/formaldehyde resins and polyisocyanates. Binder concentrations of between 5 and 12% are disclosed. Waxes may be used for water resistance and preservatives may also be added. Other methods of manufacture of particle and similar boards are disclosed in U.S. Pat. Nos. 3,164,511 to A. Elmendorf; 3,391,233 to B. Polovtseff; and 3,940,230 to E. Potter.

Aminoplast resins like melamine-urea-formaldehyde (MUF) resins are used as a top spray on resin-containing wood fibers just before pressing the fibers into medium density hardboard. As the binder resin cures under heat and pressure, the board is provided with its structural properties. Simultaneously, the top spray resin cures and seals the surface with a hard protective coating. The following references disclose methods of preparing the thermoset resins used as the "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press, Ltd., London, England; and British Pat. No. 480,316.

Often, a wood grain is molded into the board surface during the pressing step. There are times, however, when it is desirable to emboss a wood grain or other pattern into the surface of a finished board containing a top spray, such as MUF. See, Book U.S. Pat. No. 4,266,925 which is herein incorporated by reference. The embossing process involves the application of heat and pressure to the surface of the board which fractures the hard, brittle MUF coating. The resulting surface is unacceptable as well as weakening the cellulosic panel and rendering the surface vulnerable to humidity. Water extractable lignins will migrate to the surface through the fractures thereby causing surface discoloration and yellowing.

The present invention is directed to the embossing of cellulosic panels having a top spray coating that is otherwise too brittle to emboss without significant fracture. Specifically, the invention addresses a top spray coating and the use thereof in an embossing process that does not fracture the coating.

The brittleness of top spray coatings has been the subject of some concern in the art. Melamine-formaldehyde, urea-formaldehyde, and melamine-urea-formaldehyde polymers are often modified with glycols, sugars, and various latexes in attempts to reduce the brittleness of the thermosetting resins. Some attempts have been successful but at the cost of using modifying materials which may volatilize at embossing temperatures or otherwise migrate from the top coat to leave an uncured, low molecular weight residue on the surface of the press or embossing die surfaces. This buildup results in frequent nonproductive maintenance time for cleaning.

It would be useful to have a top coating that would be sufficiently flexible to accept embossing without materially affecting the hard thermosetting properties of the final coating or causing buildup on the press or embossing die surfaces.

The art has also investigated the embossing of panels having a basecoat finish on top of the formed panel. In these methods, a thermoplastic or organic solvent-based thermosetting basecoat is generally applied to the panel before embossing. Unfortunately, the conventional basecoats soften at press temperatures that are high enough to get good embossing at reasonable pressures, typically over 300° C. and 5-9 Mpa. Pieces of the basecoat separate and stick to the embossing die surface when disengaged from the panel surface. The resulting product panel thus exhibits a surface having irregular areas lacking a basecoat and an interrupted finish. Such panels are unsuitable for further finishing.

Films have been used in attempts to prevent embossed basecoatings from sticking and separating. A thin film of a heat resistant material having a thickness of 0.5 to 1.5 thousandths of an inch, (e.g., Mylar TM film) is positioned between the embossing die and the board having the basecoat. Films can be effective at eliminating separation of the print basecoat and (depending on its thickness) does permit at least some limited amount of fine line wood grain detail to be retained. Films require, however, an extra handling step in the manufacturing process and cannot be reused. Such extra costs are often not worth the limited degree of detail obtained.

Resin-impregnated paper overlays are also known as protective media that might be used to accept embossed details. Such overlays come in medium and high densities and are basically made of paper containing partially cured phenol-formaldehyde resin. The paper overlays are bonded to a wooden panel using heat and pressure. Unfortunately and in addition to the handling costs for sheets, the exposed surface of the overlay is also sufficiently reactive that a release agent is required to prevent the resin from sticking to the embossing dies.

It would be desirable to have a method for embossing cellulosic panels that does not foul the press or embossing die surfaces or require the use of either separator sheets or embossable resin-impregnated sheets.

SUMMARY OF THE INVENTION

It is an object of the invention to provide a top spray composition that will not adversely affect the hard thermosetting properties of conventional top spray resins while exhibiting flexible thermoplastic properties upon reheating sufficient to accept texture embossing with little or no buildup on press or embossing die surfaces.

It is another object of the invention to provide a panel and method for manufacture thereof that uses the top spray coating which does not fracture the board surface during the embossing process.

In accordance with these objectives and others that will become apparent from the description herein, the present invention provides a top spray coating composition exhibiting a softening point within the range from about 130° to about 300° C. wherein said top coating comprises: (a) a thermoset resin having free formaldehyde admixed with said resin in an amount within the range from about 0.1 wt % to about 1.5 wt % based on said thermoset resin; and (b) a thermoplastic polymer thoroughly admixed with said resin, wherein said thermoplastic polymer exhibits amine groups capable of reacting with either the amine reactive alkylol groups on the resin or free formaldehyde admixed with said resin under resin curing conditions.

The invention also provides a cellulosic panel coated with the above-described composition as well as a method of embossing cellulosic panels that have been treated with the top coating composition.

The invention provides a cellulosic panel with the flexibility to impart an embossed pattern that will accept fine line detail without fracturing the panel surface. While not wishing to be bound by theory, it appears that the mixture of a thermoplastic resin with a thermoset resin does not affect the hard thermosetting properties while exhibiting some flexible thermoplastic properties upon reheating with little or no embossing plate buildup.

DESCRIPTION OF THE INVENTION

The present invention relates to a panel formed from a cellulosic substrate with a hard, polymeric top spray coating that will become sufficiently flexible upon heating to embossing temperatures to accept embossed details without significant fracture of the surface. Upon cooling, the top coat will reharden thereby retaining even fine embossed details without fracture of the panel surface. The result is a cellulosic board product that can be readily embossed for use in decorative applications without the previous loss of structural integrity or vulnerability to moisture.

The planar panel used to make embossable stock in the invention is of conventional manufacture being made or derived from resin-bound particles, chips, flakes, sawdust, paper and/or other fragments of hard or soft woods in quantities sufficient to produce a self-supporting, planar wood product. Examples of trees that will serve as a source of such cellulosic materials include, but are not limited to, aspen, beech, birch, cedar, Douglas and other firs, hemlock, pine and spruce in the U.S. and Canada.

The substrate materials used in the present invention are generally pressed into shape from wood fragments coated with a bonding resin. Examples of suitable bonding resins include, inter alia, urea/formaldehyde resin, phenol/formaldehyde resin, melamine/formaldehyde resin, polymeric isocyanate resin and the like. The bonding agent is generally a liquid rather than a powder and is preferably a phenol/formaldehyde resin. Bonding resins are typically used in an amount within the range from about 1.8 to about 2.3 wt % based on the wood fragments.

A wax (e.g., a petroleum wax), may also be applied to the wood fragments at an amount within the range from about 1–2 wt % based on the wood fragments to improve water resistant properties. Conventional preservatives and other additives may also be used if desired.

The key to the present invention is the hard, top spray coating containing a thermoset resin in admixture with a thermoplastic resin in a quantity sufficient to exhibit a softening temperature within the range from about 130° to about 300° C. This minimum softening temperature is often encountered during conventional embossing processes yet is sufficiently high that normal uses for embossed panels made according to the invention will not soften and lose their embossed detail. Moreover, the softening is sufficient that there is no significant fracturing of the panel surface during the embossing and exhibits little or no transfer of material to the press or embossing die surfaces.

The quantity of top spray coating that is applied to the cellulosic substrate can vary depending on the quality and nature of the cellulosic material used. In general, top spray coating is applied to the resin-coated cellulosic material from a 25% aqueous solution at a rate within the range from about 0.5 to about 2 grams of solid resin per square foot of panel before the cellulosic material is pressed into a panel structure. A preferred application rate of top coat according to the invention is within the range from about 1 to about 1.5 grams of solid resin per square foot of panel.

The Thermoset Resin Component

Three classes of thermoset resins are preferred in the top spray coating according to the invention: phenoplasts, aminoplasts, and ketone-aldehyde condensation polymers. These polymers are made from such resins as the acid or base catalyzed phenol-aldehyde resins, urea-aldehyde resins, melamine-aldehyde resins, acetone-aldehyde resins, etc., mixtures and copolymers thereof, e.g. melamine-urea-formaldehyde (MUF) resins. The MUF resins are the preferred compositions for use as the thermoset resin component.

Specifically, the aldehyde condensation polymers which can be used as the thermoset resin component include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methyl isobutyl ketone formaldehyde, and the like. Another useful resin is the known ortho-condensed phenolformaldehyde resin made by condensing 0.7 to 1.0 moles formaldehyde with 1 mole phenol in the presence of an ortho-directing catalyst such as calcium acetate.

The aldehydes used in preparing the aminoplasts may be monofunctional (i.e. a monoaldehyde) or polyfunctional, having at least two aldehyde groups separated by at most one carbon atom. Examples of useful aldehydes include, inter alia, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde.

The condensation reaction with formaldehyde, furfuraldehyde, paraformaldehyde, polyoxymethylene or trioxane can be performed in a batch or continuously. The reactants are condensed in the presence of a mildly acidic or alkaline catalyst although the reaction may be conducted at slower rates without catalysts.

The condensation process with acrolein, glyoxal, acetaldehyde, propionaldehyde, or butyraldehyde is performed incrementally. The condensation reaction is conducted in stages by combining the reactants in the presence of a strongly acidic catalyst, neutralizing the reaction product, incorporating additional aldehyde into the neutralized product for further reaction in the presence of a mildly acidic or alkaline catalyst.

Preferred resins are aminoplast resins with water-soluble, liquid, thermosetting phenol-aldehyde resins being the most preferred resins for use as the thermoset component of the top coat composition according to the invention. Novolacs, because they lack reactive alkylol groups, are not directly useful in this invention although they may be further reacted with aldehyde to convert them to useful resoles.

For top coatings of the invention, the thermoset resin component (with a free formaldehyde content within the range from about 0.1 wt % to about 1.5 wt % based on the thermoset resin) is admixed with a thermoplastic polymer having reactive amine groups to give a top coat that will soften at a temperature within the range from about 130° to about 300° C. Preferably, the top coat composition softening temperature is within the range from about 130° to about 180° C. and most preferably within the range from about 130° to about 150° C. These softening point temperatures are within the range of board surface temperatures encountered during a typical embossing process where the embossing die surface may be significantly higher, e.g., 300° C. and above. The board surface is, therefore, imparted with detail from the die pressure while being controllably darkened by the heated die surface.

Without wishing to be bound by a particular theory of operation, it appears that the thermoplastic polymer becomes linked to the thermoset resin through reaction with the free formaldehyde to impart flexibility and provide a composition exhibiting both the hard thermosetting properties of the thermoset resin as well as some flexible thermoplastic properties upon reheating. Reaction through the free formaldehyde locks the thermoplastic into the cured polymer thereby avoiding the release of uncured resins that would result in a buildup on the press and/or embossing die surfaces.

The Thermoplastic Component

The polyamide and aminopolyamide compositions useful in the present invention embrace those semi-crystalline and amorphous resins having a molecular weight of at least 5000 having a linear or branched structure. The phrase "polyamide" refers to a condensation product that contains recurring aromatic and/or aliphatic amide groups as integral parts of the main polymer chain, such products being known generically as "nylons". Preferably, these polyamides have molecular weights of from about 5,000 to about 50,000. Furthermore, the polyamides are preferably linear with a melting point in excess of 200° C. These polyamides may be $\alpha$-polyamides, $\alpha,\omega$-polyamides, and mixture and/or copolymers of these.

By "$\alpha$-polyamides" is meant those polyamides having only one terminal group which is reactive with formaldehyde. Amine groups are preferred reactive groups. Examples of suitable $\alpha$-polyamides may be obtained by polymerizing a monoaminocarboxylic acid or an internal lactam thereof having at least two carbon atoms between the amino and carboxylic acid groups thereof. Suitable polyamides include those described in U.S. Pat. Nos. 2,071,250; 2,071,251; 2,241,322; and 2,312,966, the disclosures of which are herein incorporated by reference.

As examples of monoaminocarboxylic acids or lactams monoaminocarboxylic acids, there may be mentioned those compounds containing from 2 to 16 carbon atoms between the amino and carboxylic acid groups, said carbon atoms forming a ring with the —CO—NH— group in the case of a lactam. As particular examples of amino-carboxylic acids and lactams there may be mentioned $\epsilon$-aminocaproic acid, butyrolactam, pivalolactam, caprolactam, capryllactam, enantholactam, undecanolactam, dodecanolactam and 3- and 4-amino benzoic acids.

Illustrative examples of $\alpha$-polyamides which may constitute in whole or in part the thermoplastic polymer component include: polypyrrolidone (nylon 4); polycaprolactam (nylon 6); polyheptolactam (nylon 7); polycapryllactam (nylon 8); polynonanolactam (nylon 9); polyundecanolactam (nylon 11); and polydodecanolactam (nylon 12).

It is also possible to use in this invention polyamides prepared by the copolymerization of two or more of the above polymers or terpolymerization of the above polymers or their components.

By "$\alpha,\omega$-polyamides" is meant those polyamides having at least two terminal amine groups, e.g. on each end of a linear polyamide, which are reactive with formaldehyde and/or the amine or alkylol groups of the thermoset resin component.

Examples of such $\alpha,\omega$-polyamides are those polyamides that may be obtained by polymerizing a diamine which contains at least two carbon atoms between the amino groups thereof and a dicarboxylic acid or ester thereof. Suitable $\alpha,\omega$-polyamides include those described in U.S. Pat. Nos. 2,071,250; 2,071,251; 2,130,523; 2,130,948; and 3,393,210, the disclosures of which are herein incorporated by reference. Typically, these polyamides are prepared by polymerizing substantially equimolar proportions of the diamine and the dicarboxylic acid. Excess diamine may be employed to provide an excess of amine end groups over carboxyl end groups in the polyamide or, vice-versa, to provide an excess of carboxyl end groups over amine end groups in the polyamide.

The term "substantially equimolar proportions" in reference to the diamine and dicarboxylic acid reactants is used to cover both strict equimolar proportions and the slight departures therefrom which are involved in conventional techniques for stabilizing the viscosity of the resultant polyamides.

Examples of these diamines have the general formula $H_2N(CH_2)_nNH_2$ wherein n in an integer of from 2 to 16, such as trimethylenediamine, tetramethylenediamine, pentamethyldiamine, octamethylenediamine, decamethylenediamine, dodecamethylenediamine, hexadecamethylenediamine, and hexamethylenediamine.

Other examples of suitable diamines include C-alkylated diamines (e.g., α,2-dimethylpentamethylenediamine and 2,2,4-trimethylhexa-methylene diamine), aromatic diamines (e.g., p-phenylenediamine, 4,4'-diaminodiphenyhlsulphone, 4,4 '-diaminodiphenyl ether and 4,4'-diaminodiphenyl sulphone, 4,4'-diaminodiphenyl ether and 4,4'-diaminodiphenylmethane), and cycloaliphatic diamines like diaminodicyclohexylmethane.

Suitable dicarboxylic acids may be aromatic noting isophthalic and terephthalic acids as examples. Preferred dicarboxylic acids are of the formula HOOC—Y—COOH wherein Y represents a divalent aliphatic radical containing at least 2 carbon atoms, and examples of such acids are sebacic acid, octadecanedioic acid, suberic acid, azelaic acid, undecanedioic acid, glutaric acid, pimelic acid, and adipic acid. Oxalic acid may also be used. Furthermore, the dicarboxylic acid may be used in the form of a functional derivative thereof, for example an ester.

Illustrative examples of α,ω-polyamides which may be used in the modifying the condensation polymer in the top coat composition of the invention include: polyhexamethylene adipamide (nylon 6:6); polyhexamethylene azelaiamide (nylon 6:9); polyhexamethylene sebacamide (nylon 6:10); polyhexamethylene isophthalamide (nylon 6:IP); polyamide of hexamethylenediamine and n-dodecanedioic acid (nylon 6:12); and polyamide of dodecamethylenediamine and n-dodecanedioic acid (nylon 12:12). Preferred α,ω-polyamides include 6,6; 6,3; and 6,12. Polyamides prepared by the copolymerization of two or more of the above polymers or terpolymerization of the above polymers or their components.

Also useful is nylon produced by Dynamit Nobel, which is the product of the dimethyl ester of terephthalic acid and a mixture of isomeric trimethyl hexamethylenediamine.

A preferred example of a thermoplastic polymer containing reactive amino groups is an aminopolyamide, such as those disclosed in U.S. Pat. Nos. 2,926,116 to Keim and 3,951,921 to Espy et al. See, example 1 of each of these patents. It is not necessary, however, that the aminopolyamide be reacted with an epoxide as disclosed in those patents. The aminopolyamide may be prepared by reacting a dicarboxylic acid with a polyalkylene polyamine under such conditions as to produce a long chain aminopolyamide that is preferably water soluble.

Suitable dicarboxylic acids that can be used to prepare the aminopolyamide include diglycolic acid and the saturated aliphatic dicarboxylic acids containing from 3 through 12 carbon atoms, such as succinic acid, glutaric acid, adipic acid, pimelic acid, suberic acid, azelaic acid, sebacic acid, methyl adipic acid, and methyl glutaric acid.

Other suitable dicarboxylic acids include the aromatic acids such as terephthalic acid, isophthalic acid, and phthalic acid; and alpha-beta-unsaturated dicarboxylic acids such as maleic acid, fumaric acid, itaconic acid, glutaconic acid, citraconic acid, and mesaconic acid.

The available anhydrides of the above acids can be used in preparing the aminopolyamide. The amides of the above acids can also be used to prepare the aminopolyamide. Esters of the above acids can be employed in preparing the aminopolyamide, if desired. Another ester that can be used is an ester of malonic acid, such as, for example, dimethyl malonate, diethyl malonate, and dipropyl malonate. Mixtures of any two or more of the above reactants can be used to prepare the aminopolyamides. Thus, for example, a mixture of two different acids can be used; a mixture of two different anhydrides can be used; a mixture of two different esters can be used; a mixture of two different amides can be used; a mixture of at last one acid and at least one ester can be used; a mixture of at least one anhydride and at least one acid can be used; and a mixture of at least one acid, at least one anhydride, and at least one ester can be used.

The polyalkylene polyamine employed can be represented by the formula

$$H_2NC_nH_{2n}[N(R'')C_nH_{2n}]_xNH_2$$

wherein R" is hydrogen, $C_1$–$C_{12}$ alkyl, or $C_1$–$C_{12}$ hydroxyalkyl; n is an integer 2 through 6 and x is an integer 1 through 4. Examples of $C_1$–$C_{12}$ alkyl are methyl, ethyl, butyl, hexyl and dodecyl. Examples of $C_1$–$C_{12}$ hydroxyalkyl are hydroxyethyl, 2-hydroxypropyl, 2-hydroxybutyl and 2-hydroxydodecyl.

Specific examples of polyalkylene polyamines of the above formula that can be employed include diethylenetriamine, triethylenetetramine, tetraethylene pentamine, dipropylenetriamine, dihexamethylenetriamine, pentaethylenehexamine, iminobis(propylamine), and methyl bis(3-aminopropyl)amine.

Other polyalkylene polyamines that can be employed and which are not included in the above formula include 1,4-bis(3-aminopropyl)piperazine and 1-(2-aminoethyl)piperazine. Mixtures of two or more polyalkylene polyamines can be used if desired.

The spacing of the amine nitrogens in the aminopolyamide can be increased, if desired. This can be accomplished by substituting a diamine such as ethylenediamine, 1,3-diaminopropane, 1,2-diaminopropane, hexamethylenediamine, aminoethylethanolamine and the like for a portion of the polyalkylene polyamine. For this purpose, up to about 80% of the polyalkylene polyamine can be replaced by a molecularly equivalent amount of diamine. Usually a replacement of about 50% or less will be adequate.

Temperatures employed in carrying out reaction between the dicarboxylic acid and the polyalkylene polyamine can vary from about 50° C. to about 250° C. or higher at atmospheric pressure. Temperatures between about 80° C. and 210° C. are preferred. Lower temperatures can be employed by using reduced pressure. Time of reaction will be from about ½ hour to 4 hours and will vary inversely with temperature.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used.

As noted above, the preferred thermoset reins are condensation polymers that are polar in nature. The thermoplastic polymers admixed with these resins should also be polar for adequate chemical compatibility. Polar thermoplastic polymers are those which contain at least one polar functional group capable of chemically reacting with free formaldehyde and, to a lesser extent, be reactive toward alkylol groups on the thermoset resin. Examples of such functional groups on thermoplastic polymers that will be compatible with polar condensation resins include, inter alia, amino groups, alkylol groups, hydroxyl groups, thiol groups, carboxyl groups, isocyanate groups, epoxy groups, halogen groups, and their derivative groups including urethane groups, ester groups, amide groups, ammonium salt groups, and metal carboxylate groups. The preferred polar groups for the thermoplastic polymers are amino groups and alkylol groups.

The polar functional groups for the thermoplastic component may be bonded to either the terminal ends, the side chains or backbone of the thermoplastic polymers. As preferred examples of the polar thermoplastic polymer containing such polar functional group(s), examples include, inter alia, polyamides, thermoplastic polyesters, thermoplastic polyurethanes, vinyl alcohol polymers, vinyl ester polymers, ionomers and halogenated thermoplastics. Such polar thermoplastic polymers are disclosed in U.S. Pat. Nos. 4,080,357; 4,429,076; 4,628,072; 4,657,970; 4,657,971; and 4,906,687, the disclosures of which are herein incorporated by reference.

It should be noted that polar thermoplastic polymers having more than one reactive functional group can result in varying and controllable degrees of cross-linking. Such a phenomenon can be advantageously used to control the degree of thermoplastic flexibility imparted the top coating composition thereby permitting a reduction in the crosslink density of the condensation polymer.

Options, Panel Construction and Process

The top coat composition may be formulated with a catalyst to promote reaction between the thermoset and thermoplastic components as well as reduce buildup on the press and embossing dies. A particularly preferred catalyst is a mixture of sulfuric acid and triethylamine commercially available from Georgia-Pacific Resins, Inc. as GP 4590 (CAS No. 54272-29-6).

The construction panel product of the invention may optionally also have a layer of paper or veneer interposed between the panel and the top coat. A wide variety of papers may be used, but it is preferred that the paper be a bleached or, preferably, unbleached kraft paper.

The paper may be used in a variety of thicknesses depending on the manufacturing process and the nature of the wood fragments used in that process. Some processes may impose higher demands on strength properties of the paper to resist puncture during manufacture. Preferred thickness of kraft paper are within the range from about 3 to about 6 thousandths of an inch in thickness (75–150 microns).

The construction panels of the invention may be performed with a variety of methods. As an example, a cellulosic panel with an optional intervening layer of paper or veneer may be coated with the top coat to form a composite stock. The resulting composite is then heated under curing conditions for the binder resin to effect curing of the top coat and bonding of the layers to each other.

The curing temperature is preferably above the melting point of the thermoplastic polymer to effect bonding. Preferred temperatures are in excess of 130° C. and preferably within the range from about 150° C. to about 200° C. to cure the binder resin as well as the top coating. Pressure is preferably applied simultaneously in a press or between rollers either with or without a textured surface for embossing a detail pattern in at least one of the panel surfaces. Embossing pressures generally are within the range from about 700–1500 psi using either die plates or rollers.

In an alternative method, the panels may be manufactured in a one-step process. In such a process, a layer of top coat film is fed onto a screen or other support surface. A layer of wafers or other fragments of wood is then laid onto the top coat film, in an amount to provide a panel of the required thickness. The wafers would normally be coated or admixed with a binder, e.g. a phenol/formaldehyde resin. A second top coat film may then optionally be fed onto the wafers. The resultant composite is then fed between heated rollers (with or without a detail pattern on at least one of the surfaces thereof) at a temperature and pressure sufficient to bond the composite and form the panel. Such a one-step process may be operated in a continuous manner.

Embossing of panels according to the invention need not be performed immediately after or concurrently with the panel formation. Pre-formed panels can be run through embossing dies in a press heated to a temperature above the softening point of the top coat in a batch process or continuously. Embossing dies can be in the form of platens or rollers.

The construction panels of the invention may be used in a variety of end-uses, depending in particular on the nature of the panel. For instance, the panels may be used as the interior surfaces of buildings. Panels may be painted to provide an attractive surface, the top coat providing a surface that is capable of being painted while minimizing the uptake of paint by the panel. For panels including a decorative paper layer, the layer of paper may also be decorated in other manners. Embossed panels may be shellacked or coated with varnish or the like, to preserve and enhance the attractive features of the embossing. The panels may be nailed and are capable of accepting paintings and other wall decorations. The panels may also be used as sub-layers in the construction industry, to provide barriers to moisture or the like and to provide a surface that is capable of having other layers adhered thereto.

The invention is conveniently described with reference to the following examples. It will be understood, however, that the examples should not be construed as limitations on the scope of the appended claims.

EXAMPLES

Example 1

Preparation of Thermoplastic Component

A stirred mixture of 200 parts of diethylenetriamine and 290 parts of adipic acid is heated to 170°–175° C. for 1.5 hours with evolution of water, cooled to 140° C. and diluted to 50% solids with about 400 parts of water. The resulting aminopolyamide (dimethylenetriamine-adipic acid polyamide) has a reduced specific viscosity (RSV)=0.16 (defined as nsp/C in 1 molar aqueous $NH_4Cl$ at 25° C. at C=2 g./100 ml.).

Example 2

Preparation of Thermoplastic Component

Two hundred twenty-five grams (2.18 moles) of diethylenetriamine and 100 grams of water were placed in a 3-necked flask equipped with a mechanical stirrer, thermometer and condenser. To this was added 290 grams (2.0 moles) of adipic acid. After the acid had dissolved in the amine, the solution was heated to 185°–200° C. and held there for 1 ½ hours. Then vacuum from a water pump was applied to the flask during the period required for the contents of the flask to cool to 140° C. following which 430 grams of $H_2O$ was added. The polyamide solution contained 52.3 % solids and had an acid number of 2.1.

Examples 3–7

Top spray coatings with the formulations shown in Table 1 are prepared for testing to detrmine flexibility upon heating. The product qualities of the coating composition are listed in Table 2.

TABLE 1

| Coating Ingredients | (% Conc) | 3 | 4 | 5 | 6 | 7 |
|---|---|---|---|---|---|---|
| MUF Base Resin, GP 5361[1] | 61 | 68.0 | 90.0 | 87.0 | 78.0 | 95.2 |
| Catalyst, GP 4590 | 100 | 1.4 | 1.4 | 1.4 | 1.4 | 1.4 |
| Polyvinylalcohol | 15 | 30.2 | — | — | — | — |
| Jeffamine ED2001[2] | 100 | — | 8.2 | — | — | — |
| Polyvinylacetate | 55 | — | — | 11.2 | — | — |
| Polyamide ROPL 2707[3] | 20 | — | — | — | 20.2 | — |
| Sodium Hydroxide | 25 | .4 | .4 | .4 | .4 | .4 |

[1]MUF Resin 5361 includes melamine (17.13%), urea (11.77%), formaldehyde (47.74%), methanol (16.49%), catalyst GP 4590 (3.78%), and an unneutralized alkyl phosphate ester antistatic agent from E.I. DuPont de Nemours & Co.
[2]A polyether diamine based on a polyethylene oxide backbone terminated in primary amines
[3]Thermoplastic component made from adipic acid and diethylenetriamine, CAS No. 25085-20-5

TABLE 2

| Properties of Product Top Spray | |
|---|---|
| Property | Value or Description |
| Appearance | Water Clear to Hazy Liquid |
| % Non Volatile | 55.00–56.00 |
| Specific Gravity @ 25° C. | 1.230–1.240 |
| Viscosity, cps @ 25° C. | 50–150 |
| pH | 8.8–9.2 |
| % Free Formaldehyde | less than about 1.50 |
| Water Dilution | greater than about 50:1 |

Two grams of each liquid resin with 5 grams of water were weighed in an aluminum pan and placed in an air circulating oven set at 150° C. for 15 minutes. The samples were removed and allowed to cool at room temperature. The aluminum pans were flexed several times to observe the flexibility or brittleness of the cured film.

A second set of resin coated aluminum pans were cured at 150° C. for 15 minutes, cooled at room temperature, and placed back into the 150° C. oven for 60 seconds. They were removed and quickly checked for flexibility while still hot. By subjective observation it was determined that Example 6 was the best among examples 3–7 at providing a hard protective coating at room temperatures and was sufficiently flexible at embossing temperatures to withstand an embossing process without fracturing the board surface. The remaining samples exhibited high levels of surface cracking where the pattern meets smooth board surface.

Example 8

Table 3 lists the weight ranges for a particularly preferred formulation for top spray coating according to the invention.

TABLE 3

| Material | Concentration (%) | Weight (%) |
|---|---|---|
| Base MUF Resin GP 5361 | 61.0 | 88–93 |
| Catalyst GP 4590 | 100.0 | 1–5 |
| Thermoplastic ROPL 2707 | 48.0 | 1–15 |
| antistatic agent | 100.0 | <1 |
| Sodium Hydroxide | 25.0 | <1 |

Example 9

Raw door skin blanks, initially smooth on both sides, are fed into an embossing machine at rates varied to achieve the desired embossing depth without burning the board. The blanks travel between a lower stationary roll and a superheated upper branding die which is hydraulically controlled for predetermined pressures. The upper brand embosses a wood grain pattern onto the top of the blank.

With prior materials, the tensile strength of the board surface was so high that the embossing process at the desired depth caused burning and a fracturing of the surface here the grain ends in a smooth surface. The material of the present invention provides a desirable embossed pattern at the desired depth without burning of the surface with elimination of the majority of the fracturing.

We claim:

1. A process for the manufacture of a panel, said process comprising:

forming into a planar panel an admixture comprising cellulosic fragments coated with a sufficient quantity of binder resin to bind together said fragments under heat and pressure;

applying to at least one surface of said planar panel a top coating exhibiting a softening point within the range from about 130° to about 300° C., wherein said top coating comprises: (a) a thermoset resin having free formaldehyde admixed with said resin; and (b) a thermoplastic polymer thoroughly admixed with said resin, wherein said thermoplastic polymer exhibits amine groups capable of reacting with at least a portion of said free formaldehyde under resin curing conditions;

heating the coated panel to a temperature and under a pressure sufficient to cure said binder resin and said top coating, and embossing a pattern onto the coated side of said panel.

2. A process as in claim 1 wherein the applying step comprises:

applying a top coating which comprises: (a) a thermoset resin selected from the group consisting of phenoplasts, aminoplasts, and ketone-aldehyde condensation polymers; and (b) a thermoplastic polymer selected from the group consisting of polyamides and aminopolyamides.

3. A process as in claim 1 wherein the applying step comprises: applying a top coating which comprises: (a) a thermoset resin selected from the group consisting of a melamine-urea-formaldehyde resin or a water-soluble, liquid, phenolaldehyde resin; and (b) an aminopolyamide thermoplastic polymer.

4. A process as in claim 1 further comprising the step of allowing the cured, coated panel to cool before the embossing step.

* * * * *